United States Patent
Richter et al.

(10) Patent No.: US 11,759,983 B2
(45) Date of Patent: Sep. 19, 2023

(54) AUXETIC POLYURETHANE AND MELAMINE FOAMS BY TRIAXIAL COMPRESSION

(71) Applicant: BASF SE, Ludwigshafen am Rhein (DE)

(72) Inventors: Sebastian Richter, Lemfoerde (DE); Achim Besser, Ludwigshafen (DE); Sebastian Alexander Weisse, Ludwigshafen (DE); Johannes Poppenberg, Wyandotte, MI (US); Johann Martin Szeifert, Ludwigshafen (DE); Markus Susoff, Lemfoerde (DE); Steffen Mayer, Ludwigshafen (DE); Markus Schuette, Lemfoerde (DE); Heinz-Dieter Lutter, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 459 days.

(21) Appl. No.: 16/642,489

(22) PCT Filed: Sep. 13, 2018

(86) PCT No.: PCT/EP2018/074779
§ 371 (c)(1),
(2) Date: Feb. 27, 2020

(87) PCT Pub. No.: WO2019/053143
PCT Pub. Date: Mar. 21, 2019

(65) Prior Publication Data
US 2020/0254659 A1    Aug. 13, 2020

(30) Foreign Application Priority Data

Sep. 13, 2017 (EP) .................... 17190883

(51) Int. Cl.
| | |
|---|---|
| *B29C 44/34* | (2006.01) |
| *B29C 44/56* | (2006.01) |
| *B29C 51/02* | (2006.01) |
| *B29K 61/00* | (2006.01) |
| *B29K 75/00* | (2006.01) |

(52) U.S. Cl.
CPC ........ *B29C 44/357* (2013.01); *B29C 44/5636* (2013.01); *B29C 51/02* (2013.01); *B29K 2061/00* (2013.01); *B29K 2075/00* (2013.01); *B29K 2995/0002* (2013.01); *B29K 2995/0063* (2013.01)

(58) Field of Classification Search
CPC ............ B29C 2949/3048; B29C 63/00; B29C 51/426; B29C 51/421; B29C 51/04; B29C 48/0017; B29C 51/02; B29C 44/5636; B29C 44/357
See application file for complete search history.

(56) References Cited

U.S. PATENT DOCUMENTS

| | | | |
|---|---|---|---|
| 3,267,050 | A | 8/1966 | Kuryla et al. |
| 4,304,708 | A | 12/1981 | Marx et al. |
| 4,374,209 | A | 2/1983 | Rowlands |
| 4,668,557 | A | 5/1987 | Lakes |
| 4,972,002 | A | 11/1990 | Volkert |
| 2015/0210814 | A1 | 7/2015 | Gross et al. |
| 2018/0140157 | A1 | 5/2018 | Pung et al. |
| 2018/0140158 | A1 | 5/2018 | Pung et al. |
| 2019/0071535 | A1 | 3/2019 | Poeselt et al. |
| 2019/0119541 | A1 | 4/2019 | Bruchmann et al. |
| 2019/0144338 | A1 | 5/2019 | Bruchmann et al. |
| 2019/0177463 | A1 | 6/2019 | Lutter et al. |
| 2019/0270841 | A1 | 9/2019 | Poppenberg et al. |
| 2019/0276582 | A1 | 9/2019 | Poppenberg et al. |
| 2019/0276623 | A1 | 9/2019 | Szeifert et al. |
| 2019/0322794 | A1 | 10/2019 | Richter et al. |
| 2019/0359757 | A1 | 11/2019 | Thomas et al. |
| 2019/0359823 | A1 | 11/2019 | Tomovic et al. |
| 2020/0010607 | A1 | 1/2020 | Hollmann et al. |

(Continued)

FOREIGN PATENT DOCUMENTS

| | | |
|---|---|---|
| DE | 1111394 B | 7/1961 |
| DE | 1152536 B | 8/1963 |
| DE | 1152537 B | 8/1963 |

(Continued)

OTHER PUBLICATIONS

GE Journal of Cellular Plastics 2013 49(6) 521-533.

(Continued)

*Primary Examiner* — Stella K Yi
(74) *Attorney, Agent, or Firm* — Armstrong Teasdale LLP

(57) ABSTRACT

Described herein is a process for preparing a foam (FA) with a Poisson's ratio in the range of from −0.5 to 0.3, the method including the steps of providing a foam (F1) with a flow resistance in the range of from 3000 to 8000 Pas/m, determined according to DIN EN 29053, and subjecting the foam (F1) to thermoforming including triaxial compression, wherein the foam (F1) is not reticulated prior to step (ii). Also described herein is the foam obtained or obtainable according to the process and the use of the foam as, for example, an energy absorbing device, preferably in protective gear, furniture, cushions, in cleaning devices with improved rinse-out behavior, in shoe soles, or as sealing, insulating or anchorage providing material for example used in earphones, ear plugs or dowels, or as acoustic material.

12 Claims, No Drawings

(56) References Cited

U.S. PATENT DOCUMENTS

| | | |
|---|---|---|
| 2020/0040127 A1 | 2/2020 | Thielbeer et al. |
| 2020/0048396 A1 | 2/2020 | Richter et al. |

FOREIGN PATENT DOCUMENTS

| | | |
|---|---|---|
| DE | 1215373 B | 4/1966 |
| DE | 1222669 B | 8/1966 |
| DE | 3231497 A1 | 3/1984 |
| EP | 0011752 A1 | 6/1980 |
| EP | 0017671 A1 | 10/1980 |
| EP | 0037470 A1 | 10/1981 |
| EP | 0351614 A2 | 1/1990 |
| GB | 969965 A | 9/1964 |
| GB | 987618 A | 5/1965 |
| GB | 1022434 A | 3/1966 |
| GB | 1033912 A | 6/1966 |
| GB | 1040452 A | 8/1966 |
| GB | 2464947 A | 5/2010 |
| WO | 8800523 A1 | 1/1988 |
| WO | 9925530 A1 | 5/1999 |
| WO | 2017078990 A1 | 5/2017 |
| WO | WO2017078990 * | 5/2017 |
| WO | 2017194341 A1 | 11/2017 |
| WO | 2017216090 A1 | 12/2017 |
| WO | 2018087076 A1 | 5/2018 |
| WO | 2019011965 A1 | 1/2019 |
| WO | 2019011966 A1 | 1/2019 |
| WO | 2019052825 A1 | 3/2019 |
| WO | 2019053143 A1 | 3/2019 |

OTHER PUBLICATIONS

Smith et al. J Mater Sci (2008) 43:5851-5860.

International Preliminary Report on Patentability for International Patent Application No. PCT/EP2018/074779, dated Sep. 11, 2019, 6 pages.

International Search Report and Written Opinion for International Patent Application No. PCT/EP2018/074779, dated Nov. 20, 2018, 15 pages.

* cited by examiner

AUXETIC POLYURETHANE AND MELAMINE FOAMS BY TRIAXIAL COMPRESSION

CROSS-REFERENCE TO RELATED APPLICATIONS

This application is a U.S. National Phase application of International Patent Application No. PCT/EP2018/074779, filed Sep. 13, 2018, which claims the benefit of priority to European Patent Application No. 17190883.3, filed Sep. 13, 2017, the entire contents of which are hereby incorporated by reference herein.

FIELD OF THE INVENTION

The present invention is directed to a process for preparing a foam (FA) with a Poisson's ratio in the range of from −0.8 to 0.3 comprising the steps of providing a foam (F1) with a flow resistance in the range of from 3000 to 8000 Pas/m$^2$, determined according to DIN EN 29053, and subjecting the foam (F1) to thermoforming comprising triaxial compression, wherein the foam (F1) is not reticulated prior to step (ii). The present invention also relates to the foam obtained or obtainable according to said process and the use of said foam as for example energy absorbing device, preferably in protective gear, furniture, cushions, in cleaning devices with improved cleaning or rinse-out behavior, in shoe soles, or as sealing, insulating or anchorage providing material for example used in earphones, ear plugs or dowels, or as acoustic material.

BACKGROUND

Foams with a negative Poisson's ratio are also known as auxetic foams. Processes for preparing auxetic foams are known from the state of the art. Known processes for preparing auxetic materials characterized by a negative Poisson's ratio as for example disclosed in WO 88/00523 A1, start from reticulated polymer foams, which means that the cell structure of the foams is modified before a thermoforming step. This results in additional process steps and makes the overall process less efficient.

SUMMARY

Starting from the state of the art, it was one object of the present invention to provide a process for preparing foams with a low Poisson's ratio, preferably with a negative Poisson's ratio, which is efficient and can be applied on a large scale. Furthermore, it was an object of the present invention to provide a foam with a low Poisson's ratio, preferably with a negative Poisson's ratio.

DETAILED DESCRIPTION

According to the present invention, this object is solved by a process for preparing a foam (FA) with a Poisson's ratio in the range of from −0.8 to 0.3 comprising the steps (i) and (ii):

(i) providing a foam (F1) with a flow resistance in the range of from 3000 to 8000 Pas/m$^2$, determined according to DIN EN 29053, (ii) subjecting the foam (F1) to thermoforming comprising triaxial compression, wherein the foam (F1) is not reticulated prior to step (ii).

It was surprisingly found that foams with a flow resistance in the range of from 3000 to 8000 Pas/m$^2$, determined according to DIN EN 29053, could be subjected to a thermoforming step without prior reticulating the foam resulting in foams with a Poisson's ratio in the range of from −0.8 to 0.3, in several embodiments below 0. It was also found that the higher the open-cellular character of a foam, the larger is the observed auxetic behavior after conversion.

According to the present invention, according to step (i), a foam (F1) with a flow resistance in the range of from 3000 to 8000 Pas/m$^2$, determined according to DIN EN 29053, is provided. Suitable foams are in principle known from the state of the art and the structure and chemical nature of suitable foams may vary in wide ranges. The foam (F1) is then subjected to thermoforming comprising triaxial compression according to step (ii) of the process of the present invention. The foam (F1) is not reticulated prior to step (ii) according to the present invention. According to the present invention, foam (F1) has to be stable in the temperature range which is applied during the process. Preferably, the foam (F1) is stable in a temperature range up to 260° C., for example in a range from 20° C. to 260° C. Furthermore, foam (F1) generally has to be suitable for thermoforming, i.e. the foam (F1) should be flexible under the conditions of the thermoforming according to step (ii).

According to the present invention, foam (F1) is characterized by a flow resistance in the range of from 3000 to 8000 Pas/m$^2$, determined according to DIN EN 29053, which is related to the cell structure of the foam. Preferably, the flow resistance of the foam (F1) is in the range of from 3500 to 7500 Pas/m$^2$, determined according to DIN EN 29053, more preferable in the range of from 4000 to 7000 Pas/m$^2$, determined according to DIN EN 29053, in particular in the range of from 4200 to 6600 Pas/m$^2$, determined according to DIN EN 29053.

In step (ii) of the process of the present invention the foam (F1) is subjected to thermoforming. In the context of the present invention, the term thermoforming denotes a treatment which includes forming of the foam at elevated temperature and may also include several steps at different temperatures.

The thermoforming generally comprises triaxial compression and heating of the foams. The foams may for example be converted using a thermo-mechanical method. The unconverted foam may be in the form of a square cross-section cuboid with dimensions of L in length and W in width prior to conversion. A linear compression ratio (compressed-to-uncompressed dimension) LCR may be defined, and then be employed in all three directions during conversion by inserting the foam into a conversion mold, for example a metallic conversion mold of internal dimensions LCR×L and LCR×W. Lubricant may be used as required to minimize surface creasing during insertion of the foam into the conversion mold. End tabs can be applied to the end of the mold once the foam is inserted.

Suitable compression ratios (LCR) are for example in the range of from 0.33 to 0.9, preferably in the range of from 0.4 to 0.85, more preferable in the range of from 0.5 to 0.8. Therefore, according to a further embodiment the present invention also relates to a process as disclosed above, wherein the thermoforming is carried out with a linear compression ratio (LCR) in all three directions in the range of from 0.33 to 0.9.

A suitable compression apparatus may for example have a base to support the conventional foam, with pairs of plates, such as for example two side compression plates, and top-to-bottom plates.

Press temperature and press pressure may be constant over the entire press time or may be varied in a suitable manner. In general, molding is effected under constant conditions, but temperature or pressure programs may also be advantageous, particularly in the case of parts which are large or have complicated shapes.

According to a preferred procedure, densification may consist of four stages. Firstly, the apparatus is preheated to a specific temperature in the oven. Secondly, the apparatus is taken out of the oven and the fully cured polymer foam is placed in between the compression plates of the device. Thirdly, the foam is manually compressed, for example using pairs of plates and, e.g. by one side plate pushing horizontally inward on the foam followed by the adjacent side plate repeating the action. While remaining in the mold, the compressed foam is then heated and cured in the oven for a set amount of time. Finally, the mold is removed from the oven and is opened immediately, exposing the foam to ambient temperature. Rapid cooling of the compressed foam is possible because the low density of the original polymer cell structure is maintained in the microcell structure, allowing hot air to be exchanged easily.

Therefore, according to a further embodiment the present invention also relates to a process as disclosed above, wherein step (ii) comprises at least one compression step (C1) at a temperature (T1) and at least one demolding step (D).

According to the present invention, the process may also comprise two or more compression steps at different temperatures and two or more demolding steps.

According to the present invention, the steps of the triaxial compression may vary and be for example adapted to the thickness of the foam.

According to one embodiment, step (ii) may for example comprise one compression step (C1) at a temperature (T1), a second compression step (C2) at a temperature (T2) and a third compression step (C3) at a temperature (T3). The process may also comprise one or more demolding steps or temperature treatments.

The process step (ii) may for example encompass a first compression step (C1) which is carried out for a time (t1) in the range of from 1 to 30 minutes at a temperature (T1) in the range of from 120 to 260° C., a demolding step (D1) at a temperature (T1') in the range of from 120 to 260° C., a second compression step (C2) which is carried out for a time (t2) in the range of from 1 to 25 minutes at a temperature (T2) in the range of from 120 to 260° C., a second demolding step (D2) at a temperature (T2') in the range of from 120 to 260° C., a third compression step (C3) which is carried out for a time (t3) in the range of from 1 to 30 minutes at a temperature (T3) in the range of from 50 to 150° C., and a third demolding step (D3) at a temperature (T3') in the range of from 50 to 150° C.

Preferably, (T1), (T1'), (T2) and/or (T2') is in the range of from 150 to 220° C., and (T3) and/or (T3') preferably is in the range of from 70 to 120° C.

However, the present invention also encompasses embodiments in which step (ii) comprises less compression steps such as for example two compression steps. According to a further embodiment, process step (ii) may for example encompass a first compression step (C1) which is carried out for a time (t1) in the range of from 1 to 30 minutes at a temperature (T1) in the range of from 120 to 260° C., a demolding step (D1) at a temperature (T1') in the range of from 120 to 260° C., a second compression step (C2) which is carried out for a time (t2) in the range of from 1 to 30 minutes at a temperature (T2) in the range of 50 to 150° C., and a second demolding step (D2) at a temperature (T2') in the range of from 50 to 150° C.

Preferably, (T1) and/or (T1') is in the range of from 150 to 220° C., and (T2) preferably is in the range of from 70 to 120° C.

Suitable foams (F1) have a flow resistance in the range of from 3000 to 8000 Pas/m$^2$, determined according to DIN EN 29053. Suitable foams are for example foams based on melamine and formaldehyde, in particular foams based on melamine and formaldehyde with a density in the range of from 3 to 20 g/l, preferably in the range of from 5 to 13 g/l, more preferable with a density in the range of from 7 to 11 g/l. Therefore, according to one embodiment the present invention also relates to a process as disclosed above, wherein the foam (F1) is a foam based on melamine and formaldehyde with a density in the range of from 3 to 20 g/l, preferably in the range of from 5 to 13 g/l.

Open-cell resilient foams based on melamine/formaldehyde condensates and processes for their preparation are in principle known from the state of the art.

Suitable foams may for example be prepared from a melamine/formaldehyde precondensate having a molar melamine:formaldehyde ratio greater than 0.3. This is effected in a manner known per se and is described, for example, in WO 01/94436. For example, a melamine/formaldehyde precondensate may be used as a starting material. Melamine/formaldehyde condensates may contain, in addition to melamine, up to 50, preferably up to 20, % by weight of modifying compounds and, in addition to formaldehyde, up to 50, preferably up to 20, % by weight of other aldehydes, in the form of condensed units. An unmodified melamine/formaldehyde condensate is particularly preferred. Examples of suitable modifying compounds are alkyl- and aryl-substituted melamine, urea, urethanes, carboxamides, dicyandiamide, guanidine, sulfurylamide, sulfonamides, aliphatic amines, glycols, phenol and derivatives thereof. Other aldehydes which may be used are, for example, acetaldehyde, trimethylolacetaldehyde, acrolein, benzaldehyde, furfural, glyoxal, glutaraldehyde, phthalaldehyde and terephthalaldehyde. Further details on melamine/formaldehyde condensates are to be found in Houben-Weyl, Methoden der organischen Chemie, Volume 14/2, 1963, pages 319 to 402.

The molar melamine:formaldehyde ratio is defined as the quotient of the amount of melamine and amount of formaldehyde and, according to the invention, is greater than 0.3 (i.e. 1:3). It is preferably from 1 (i.e. 1:1) to 0.5 (i.e. 1:2), In particular from 0.769 (i.e. 1:1.3) to 0.556 (i.e. 1:1.8).

Generally, the addition of an emulsifier or of emulsifier mixture is required for emulsifying the blowing agent and for stabilizing the foam. Anionic, cationic and nonionic surfactants and mixtures thereof may be used as the emulsifier. Suitable anionic surfactants are diphenylene oxide sulfonates, alkane- and alkylbenzenesulfonates, alkylnaphthalenesulfonates, olefinsulfonates, alkylether sulfonates, fatty alcohol sulfates, ether sulfates, alpha-sulfo-fatty esters, acylaminoalkanesulfonates, acylisethionates, alkyl ether carboxylates, N-acylsarcosinates, alkyl and alkyl ether phosphates. Alkylphenol polyglycol ethers, fatty alcohol polyglycol ethers, fatty acid polyglycol ethers, fatty acid alkanolamines, EO/PO block copolymers, amine oxides, lyceryl fatty esters, sorbitan esters and alkylpolyglucosides may be used as nonionic surfactants. Cationic emulsifiers which may be used are alkyltriammonlum salts, alkylbenzyldimethylammonium salts and alkylpyridinium salts. The emulsifiers are preferably added in amounts of from 0.2 to 5% by weight, based on the resin.

In order to produce a foam from the melamine resin solution, said solution must contain an emulsified blowing agent, the amount depending on the desired density of the foam. In principle, both physical and chemical blowing agents may be used in the novel process. Possible physical blowing agents are, for example, hydrocarbons, halogenated, in particular fluorinated, hydrocarbons, alcohols, ethers, ketones and esters in liquid form or air and $CO_2$ as gases. Examples of suitable chemical blowing agents are isocyanates as a mixture with water, $CO_2$ being liberated as the effecting blowing agent, and furthermore carbonates and bicarbonates as a mixture with acids, which likewise produce $CO_2$, and azo compounds, such as azodicarboxamide. In a preferred embodiment of the invention, from 1 to 40% by weight, based on the resin, of a physical blowing agent having a boiling point of from 0 to 80° C. are added to the aqueous solution or dispersion; In the case of pentane, it is preferably from 5 to 15% by weight.

Curing agents used are acidic compounds which catalyze the further condensation of the melamine resin. The amounts are from 0.01 to 20, preferably from 0.05 to 5, % by weight, based on the resin. Inorganic and organic acids are suitable, for example hydrochloric acid, sulfuric acid, phosphoric acid, nitric acid, formic acid, acetic acid, oxalic acid, toluenesulfonic acids, amidosulfonic acids and acid anhydrides.

Depending on the use of the shaped article, the aqueous solution or dispersion may be free of further additives. For some purposes, however, it may be advantageous to add up to 20, preferably less than 10, % by weight, based on the resin, of conventional additives, such as dyes, flameproofing agents, UV stabilizers, and compositions for reducing the combustion gas toxicity or for promoting carbonization. Since the foams are generally open-pore and can absorb water, it may be necessary for some intended uses to add water repellants in amounts of from 0.2 to 5% by weight. For example, paraffin dispersions, silicone dispersions and fluoroalkane dispersions, in particular emulsions thereof, are suitable.

The concentration of the melamine/formaldehyde precondensate in the mixture of precondensate and solvent may vary within wide limits of from 55 to 85, preferably from 63 to 80, % by weight. The preferred viscosity of the mixture of precondensate and solvent is from 1 to 3 000, preferably from 5 to 2000 mPas.

The additives are homogeneously mixed with the aqueous solution or dispersion of the melamine resin, it being possible, if necessary, also to force in the blowing agent under pressure. However, it is also possible to start from a solid, for example spray-dried, melamine resin and then to mix this with an aqueous solution of the emulsifier, the curing agent and the blowing agent. The mixing with the components can be carried out, for example, in an extruder. After the mixing, the solution or dispersion is discharged through a die and immediately thereafter heated and foamed thereby.

The heating of the blowing agent-containing solution or dispersion can in principle be carried out as described, inter alia, in EP-A 17671 by means of hot air, steam, exposure to high-frequency radiation or exposure to microwave radiation or by utilizing the heat of reaction. Preferably, however, the required heating is carried out by exposure to ultrahigh frequency radiation, according to EP-A 37470. In the case of this dielectric radiation, it is possible in principle to employ microwaves in the frequency range from 0.2 to 100 GHz. For industrial practice, frequencies of 0.915, 2.45 and 5.8 GHz are available, 2.45 GHz being particularly preferred. A radiation source of dielectric radiation is the magnetron, it also being possible to effect exposure simultaneously with a plurality of magnetrons. During the exposure to radiation, it should be ensured that the field distribution is very homogeneous. Expediently, the exposure to radiation is carried out in such a way that the power consumption of the solution or dispersion is from 5 to 200, preferably from 9 to 120, kW, based on 1 kg of water in the solution or dispersion. If the power consumed is lower, no foaming takes place and the mixture merely cures. If the procedure is effected within the preferred range, the mixture foams all the more rapidly the greater the power consumption, above about 200 kW per kg of water, the foaming rate no longer increases substantially.

The exposure of the mixture to be foamed to radiation is usually effected immediately after it has emerged from the foam die. The mixture which is foaming as a result of a temperature increase and evaporation of the blowing agent is applied, for example, onto revolving belts which form a rectangular channel for shaping the foam. A foam strand, which is usually divided into slabs, is usually obtained.

The resulting foams can be used in step (i) of the present invention or may be treated before being subjected to the process of the present invention. Suitable treatment steps may include annealing or curing steps.

The properties of the foams based on melamine and formaldehyde which may be used in the process of the present invention may vary in wide ranges. The melamine to formaldehyde ratio may for example be in the range of from 1:1 to 1:3, preferably in the range of from 1:1.5 to 1:2.5. Therefore, according to a further embodiment the present invention also relates to a process as disclosed above, wherein the foam (F1) is a foam based on melamine and formaldehyde in a ratio in the range of from 1:1 to 1:3.

In case foam (F1) is a foam based on melamine to formaldehyde, the thermoforming preferably is carried out at a temperature in the range of from 120 to 260° C., more preferred from 160-220° C. Therefore, according to a further embodiment the present invention also relates to a process as disclosed above, wherein the thermoforming is carried out at a temperature in the range of from 120 to 260° C.

Another group of foams which may be used in the process of the present invention are polyurethane foams. The properties of suitable foams may vary in wide ranges. Particularly suitable are polyurethane foams with a density in the range of from 10 to 150 g/l. Therefore, according to a further embodiment the present invention also relates to a process as disclosed above, wherein the foam (F1) is a polyurethane foam with a density in the range of from 10 to 150 g/l.

Suitable foams are in principle known from the state of the art. Suitable low-density flexible polyurethane foams may for example be obtained by reacting organic and/or modified organic polyisocyanates (a) with a specific polyetherol mixture (b) and, if required, further compounds (c) having hydrogen atoms reactive toward isocyanates, in the presence of water and/or blowing agents (d), catalysts (e) having a specific gel catalyst/blowing catalyst ratio and, if required, further assistants and additives (f).

The preparation of flexible polyurethane foams by reacting organic and/or modified organic polyisocyanates or prepolymers with compounds having a higher functionality and at least two reactive hydrogen atoms, for example polyoxyalkylenepolyamines and/or preferably organic polyhydroxy compounds, in particular polyetherols or polyesterols, having molecular weights of from 300 to 6 000, and, if required, chain extenders and/or crosslinking agents having molecular weights of up to 400, in the presence of catalysts, blowing agents, flameproofing agents, assistants and/or additives, is known and has been widely described. A review of the preparation of flexible polyurethane foams is given, for example, in Kunststoff-Handbuch, Volume VII, Polyurethane, 1st Edition 1966, edited by Dr. R. Vieweg and Dr. A. Hochtlen, and 2nd Edition, 1983, and 3rd Edition, 1993 edited in each case by Dr. G. Oertel (Carl Hanser Verlag, Munich).

Water is preferably used as the blowing agent, particularly in the case of flexible polyurethane foams. In the reaction with the corresponding isocyanates, ureas form and are to a large extent responsible for rigidity-determining properties. It is understandable and obvious that in particular the method of water addition and the amount of water used are of great importance for the foam properties.

Particularly suitable polyurethane foams may be prepared by reacting organic and/or modified organic polyisocyanates (a) with a polyetherol mixture (b) and, if required, further compounds (c) having hydrogen atoms reactive toward isocyanates, in the presence of water and/or other blowing agents (d), catalysts (e) and, if required, further assistants and additives (f), wherein the polyetherol mixture (b) consists of b1) at least one difunctional or polyfunctional polyetherol based on propylene oxide and/or butylene oxide and ethylene oxide, having an ethylene oxide content of more than 40% by weight, based on the total amount of alkylene oxide used, an OH number of from 20 to 100 mg KOH/g and a content of primary OH groups of more than 20% and b2) at least one difunctional or polyfunctional polyetherol based on propylene oxide and/or butylene oxide and, if required, ethylene oxide, the ethylene oxide content being not more than 40% by weight, and having an OH number of more than 25 mg KOH/g, water in amounts of up to 15% by weight, based on the total weight of the components (b) to (f), and a mixture of gel catalysts and blowing catalysts are used and the foaming is effected in an index range of from 20 to 120. The index defines the ratio of hydroxyl groups to isocyanate groups, i.e. a ratio of 1:1 is defined as an index of 100, an excess of hydroxyl groups is defined as an index <100 and an excess of isocyanates as an index >100, respectively.

With respect to the components used according to the invention in the polyol mixture, the following may be stated:

The component (b1) consists of at least one difunctional or polyfunctional polyetherol based on propylene oxide and/or butylene oxide and ethylene oxide, having an ethylene oxide content of more than 40, preferably more than 60, % by weight, based in each case on the total amount of alkylene oxide used, an OH number of from 20 to 120, preferably from 30 to 60, mg KOH/g and a content of primary OH groups of more than 20%, preferably from 40 to 85%.

For example, the following are suitable as (b1) for this purpose: polyetherols based on ethylene glycol, glycerol or trimethylolpropane as an initiator, having an ethylene oxide block or having randomly incorporated ethylene oxide. Polyetherols based on glycerol and having an ethylene oxide endcap are preferably used but a propylene oxide endcap may also be used.

The polyetherols (b1) are preferably used in amounts of more than 50, in particular from 60 to 90, % by weight, based in each case on the total weight of the component (b).

The component (b2) consists of at least one difunctional or polyfunctional polyetherol based on propylene oxide and/or butylene oxide and, if required, ethylene oxide, the ethylene oxide content being not more than 40% by weight, and having an OH number of more than 25, preferably more than 40, mg KOH/g.

For example, the following are suitable as (b2) for this purpose: polyetherols based on propylene glycol, glycerol, toluenediamine and sorbitol and propylene oxide. Ethylene oxide may be incorporated in amounts of up to 40% by weight. Polyether alcohols based on propylene oxide with propylene glycol as an initiator are preferably used.

The polyetherols (b2) are preferably used in amounts of less than 30, in particular from 10 to 20, % by weight, based in each case on the total weight of the component (b).

Said polyetherols are prepared by known processes, as described by way of example further below.

Suitable flexible polyurethane foams are prepared by reacting organic and/or modified organic polyisocyanates (a) with the polyetherol mixture (b) described above and, if required, further compounds (c) having hydrogen atoms reactive toward isocyanates, in the presence of water and/or other blowing agents (d), catalysts (e) and, if required, further assistants and additives (f).

Generally, the foams are prepared at indices of from 20 to 120, preferably from 60 to 110.

Regarding the further starting components which may be used, the following may be stated specifically:

Suitable organic polyisocyanates (a) for the preparation of the novel polyurethanes are the aliphatic, cycloaliphatic, araliphatic and preferably aromatic polyfunctional isocyanates known per se.

Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanates and any desired mixtures of these isomers, 1-isocyanato-3,3,5-trimethyl-5-isocyanatomethyl-cyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably di- and polyisocyanates, such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic di- and polyisocyanates can be used individually or in the form of their mixtures.

Tolylene diisocyanate, mixtures of diphenylmethane diisocyanate isomers, mixtures of diphenylmethane diisocyanate and crude MDI or tolylene diisocyanate with diphenylmethane diisocyanate and/or crude MDI are preferably used. Mixtures containing more than 30% by weight of diphenylmethane 2,4'-diisocyanate are particularly preferably used.

Frequently, modified polyfunctional isocyanates, i.e. products which are obtained by chemical reaction of organic di- and/or polyisocyanates are also used. Examples are di- and/or polyisocyanates containing ester, urea, biuret, allophanate, carbodiimide, isocyanurate, uretdione and/or urethane groups. Specific examples are organic, preferably aromatic, polyisocyanates containing urethane groups and having NCO contents of from 43 to 15, preferably from 31 to 21, % by weight, based on the total weight, diphenylmethane 4,4'-diisocyanate modified by reaction, for example with low molecular weight diols, triols, dialkylene glycols, trialkylene glycols or polyalkylene glycols having molecular weights up to 6 000, in particular up to 1 500, modified diphenylmethane 4,4'- and 2,4'-isocyanate mixtures or modified crude MDI or tolylene 2,4- or 2,6-diisocyanate. The di- or polyoxyalkylene glycol can be used individually or as mixtures, examples being diethylene and dipropylene glycol, polyoxyethylene, polyoxypropylene and polyoxypropylenepolyoxyethylene glycols, triols and/or tetrols. Also suitable are NCO-containing prepolymers having NCO contents of from 25 to 3.5, preferably from 21 to 14, % by weight, based on the total weight, prepared from the polyesterpolyols and/or preferably polyetherpolyols described below and diphenylmethane 4,4'-diisocyanate, mixtures of diphenylmethane 2,4'- and 4,4'-diisocyanate, tolylene 2,4- and/or 2,6-diisocyanates or crude MDI. Liquid polyisocyanates containing carbodiimide groups and/or isocyanurate rings and having NCO contents of from 43 to 15, preferably from 31 to 21, % by weight, based on the total weight, for example based on diphenylmethane 4,4'-, 2,4'- and/or 2,2'-diisocyanate and/or tolylene 2,4- and/or 2,6-diisocyanate, have also proven useful.

The modified polyisocyanates can be mixed with one another or with unmodified organic polyisocyanates, e.g. diphenylmethane 2,4'- or 4,4'-diisocyanate, crude MDI or tolylene 2,4- and/or 2,6-diisocyanate.

Modified organic polyisocyanates which have proven particularly useful are NCO-containing prepolymers which are advantageously formed by reaction of at least parts of the components (a), (b) and, if required, (c) and/or (d), particularly those which contain the component (b1) at least in a proportionate amount.

In addition to the polyetherol mixture (b) described above and used according to the invention, further compounds (c) having hydrogen atoms reactive toward isocyanates are added if required.

Compounds having at least two reactive hydrogen atoms are primarily suitable for this purpose. Those having a functionality of from 2 to 8, preferably from 2 to 3, and an average molecular weight of from 300 to 8 000, preferably from 300 to 5 000, are expediently used. The hydroxyl number of the polyhydroxy compounds is as a rule from 20 to 160, preferably from 28 to 112.

The polyetherpolyols used in the components (b) and (c) are prepared by known processes, for example by anionic polymerization using alkali metal hydroxides, e.g. sodium hydroxide or potassium hydroxide, or alkali metal alcoholates, e.g. sodium methylate, sodium ethylate, potassium ethylate or potassium isopropylate, as catalysts and with addition of at least one initiator which contains from 2 to 8, preferably 2 or 3, bonded reactive hydrogen atoms per molecule, or by cationic polymerization using Lewis acids, such as antimony pentachloride, boron fluoride etherate, etc., or bleaching earths as catalysts or by double metal cyanide catalysis from one or more alkylene oxides having 2 to 4 carbon atoms in the alkylene radical. For specific intended uses, monofunctional initiators may also be incorporated into the polyether structure.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately in succession or as mixtures.

Examples of suitable initiator molecules are water, organic dicarboxylic acids, such as succinic acid, adipic acid, phthalic acid and terephthalic acid, aliphatic and aromatic, unsubstituted or N-monoalkyl-, N,N-dialkyl- and N,N'-dialkyl-substituted diamines having 1 to 4 carbon atoms in the alkyl radical, such as unsubstituted or mono- alkyl- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamine, 2,3-, 2,4- and 2,6-toluenediamine and 4,4'-, 2,4'- and 2,2'-diaminodiphenylmethane. Other suitable initiator molecules are alkanolamines, e.g. ethanolamine, N-methyl- and N-ethylethanolamine, dialkanolamines, e.g. diethanolamine, N-methyl- and N-ethyldiethanolamine, and trialkanolamines, e.g. triethanolamine, and ammonia. Polyhydric, in particular dihydric and/or trihydric, alcohols, such as ethanediol, 1,2- and 2,3-propanediol, diethylene glycol, dipropylene glycol, 1,4-butanediol, 1,6-hexanediol, glycerol, trimethylolpropane and pentaerythritol, are preferably used.

The polyetherpolyols, preferably polyoxypropylenepolyols and polyoxypropylenepolyoxyethylenepolyols, have a functionality of, preferably, from 2 to 8, in particular from 2 to 3, and molecular weights of from 300 to 8 000, preferably from 300 to 6 000, in particular from 1 000 to 5 000, and suitable polyoxytetramethylene glycols have a molecular weight of up to about 3 500 and suitable polyoxytetramethylene glycol have a molecular weight of up to about 3 500.

Other suitable polyetherpolyols are polymer-modified polyetherpolyols, preferably graft polyetherpolyols, in particular those based on styrene and/or acrylonitrile, which are prepared by in situ polymerization of acrylonitrile, styrene or preferably mixtures of styrene and acrylonitrile, for example in a weight ratio of from 90:10 to 10:90, preferably from 70:30 to 30:70, expediently in the above mentioned polyetherpolyols, analogously to DE 1111394, DE 1222669, DE 1152536 and DE 1152537, and polyetherpolyol dispersions which contain, as the disperse phase, usually in an amount of from 1 to 50, preferably from 2 to 25, % by weight of, for example, polyureas, polyhydrazides, polyurethanes containing bonded tert-amino groups and/or melamine, and which are described, for example, in EP-B-011752, U.S. Pat. No. 4,374,209 and DE-A-3231497.

The polyetherpolyols can be used individually or in the form of mixtures.

In addition to the polyetherpolyols described, it is also possible to use, for example, polyetherpolyamines and/or further polyols selected from the group consisting of the polyesterpolyols, polythioetherpolyols, polyesteramides, hydroxyl-containing polyacetals and hydroxyl-containing aliphatic polycarbonates or mixtures of at least two of said polyols. The hydroxyl number of the polyhydroxy compounds is as a rule from 20 to 80, preferably from 28 to 56.

Suitable polyesterpolyols can be prepared, for example, from organic dicarboxylic acids of 2 to 12 carbon atoms, preferably aliphatic dicarboxylic acids of 4 to 6 carbon atoms, polyhydric alcohols, preferably diols, of 2 to 12, preferably 2 to 6, carbon atoms, by conventional processes. Usually, the organic polycarboxylic acids and/or derivatives thereof and polyhydric alcohols, advantageously in a molar ratio of from 1:1 to 1:1.8, preferably from 1:1.05 to 1:1.2, are subjected to polycondensation in the absence of a catalyst or preferably in the presence of esterification catalysts, expediently in an atmosphere comprising inert gas, e.g. nitrogen, carbon monoxide, helium, argon, etc., in the melt at from 150 to 250° C., preferably from 180 to 220° C., under atmospheric or reduced pressure, to the desired acid number, which is advantageously less than 10, preferably less than 2.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerization of cyclic acetals. Suitable hydroxyl-containing polycarbonates are those of the type known per se, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene. The polyesteramides include, for example, the predominantly linear condensates obtained from polybasic, saturated and/or unsaturated carboxylic acids or their anhydrides and polyhydric saturated and/or unsaturated amino alcohols and mixtures of polyhydric alcohols and amino alcohols and/or polyamines. Suitable polyetherpolyamines can be prepared from the above mentioned polyetherpolyols by known processes. The cyanoalkylation of polyoxyalkylenepolyols and subsequent hydrogenation of the nitrile formed (U.S. Pat. No. 3,267,050) or the partial or complete amination of polyoxyalkylenepolyols with amines or ammonia in the presence of hydrogen and catalysts (DE-A-1215373) may be mentioned by way of example.

The compounds of component (c) can be used individually or in the form of mixtures.

The flexible polyurethane foam can be prepared in the presence or absence of chain extenders and/or crosslinking agents, although these are generally not required. Chain extenders and/or crosslinking agents used are diols and/or triols having molecular weights of less than 400, preferably from 60 to 300. Suitable for example, are aliphatic, cycloaliphatic and/or araliphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroqui-none, triols, such as 1,2,4- and 1,3,5-dihydroxycyclohexane, triethanolamine, diethanolamine, glycerol and trimethylolpropane, and low molecular weight hydroxyl-containing polyalkylene oxides based on ethylene oxide and/or 1,2-propylene oxide and the abovementioned diols and/or triols as initiator molecules.

If chain extenders, crosslinking agents or mixtures thereof are used for the preparation of the polyurethane foams, they are expediently employed in an amount of up to 10% by weight, based on the weight of the polyol compounds.

Preferably, water in amounts of form 0.5 to 15, preferably from 1 to 10, particularly preferably from 3 to 10, % by weight, based in each case on the total weight of the components (b) to (f), is used as blowing agent (d).

The addition of water can be effected in combination with other conventional blowing agents. For example, the chlorofluorocarbons (CFCs) generally known from polyurethane chemistry and highly fluorinated and/or perfluorinated hydrocarbons are suitable for this purpose. However, the use of these substances is greatly restricted or being completely discontinued for ecological reasons. In addition to chlorofluorocarbons and fluorocarbons, in particular aliphatic and/or cycloaliphatic hydrocarbons, especially pentane and cyclopentane, or acetals, e.g. methylal, are possible alternative blowing agents. These physical blowing agents are usually added to the polyol component of the system. However, they can also be added to the isocyanate component or, as a combination, to both the polyol component and the isocyanate component. They may also be used together with highly fluorinated and/or perfluorinated hydrocarbons, in the form of an emulsion of the polyol component. Usually oligomeric acrylates which contain polyoxyalkylene and fluoroalkane radicals as side groups and have a fluorine content of from about 5 to 30% by weight are employed as emulsifiers, where they are used. Such products are sufficiently well known from plastics chemistry, e.g. EP-A-0351614. The amount of the blowing agent or blowing agent mixture which may be used in addition to water is advantageously from 1 to 10, preferably from 1 to 3, % by weight, based in each case on the total weight of the components (b) to (d).

Catalysts (e) used for the preparation of the flexible polyurethane foams are in particular compounds which greatly accelerate the reaction of the reactive hydrogen atoms, in particular of hydroxyl-containing compounds of components (b), (c) and (d), with the organic, unmodified or modified polyisocyanates (a).

Preferably, a mixture of gel catalysts and blowing catalysts is used.

Suitable gel catalysts are advantageously amine gel catalysts, organometallic gel catalysts or any desired mixtures of amine and organometallic gel catalysts. These catalysts accelerate the reaction of the isocyanates with the polyols.

The amine gel catalyst used is, for example, diazabicycloundecane or, preferably, 1,4-diazabicyclo[2.2.2]octane (Dabco).

Suitable organometallic gel catalysts are organic metal compounds, preferably organic tin compounds, such as tin(II) salts of organic carboxylic acids, e.g. tin(II) acetate, tin(II) octanoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate.

Examples of suitable blowing catalysts, which in particular favor the reaction of the isocyanate with the water, are tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethyl-1,6-hexanediami-ne, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and aminoalkanol compounds, such as triethanolamine, triisopropanolamine, N-methyl- and N-ethyldiethanolamine and dimethylethanolamine.

In addition to the gel catalysts and blowing catalysts, further catalysts customary in polyurethane chemistry may be present. For example, the following are suitable for this purpose: tris(dialkylaminoalkyl)-s-hexahydrotriazines, in particular tris(N,N-dimethylaminopropyl)-shexahydrotriazine, tetraalkylammonium hydroxides, such as tetramethylammonium hydroxide, alkali metal hydroxide, such as sodium hydroxide, and alkali metal alcoholates, such as sodium methylate and potassium isopropylate, and alkali metal salts of long-chain fatty acids having 10 to 20 carbon atoms and, if required, OH side groups. These catalysts can be used only to a limited extent for flexible foams and support the PIR reaction.

Advantageously, amine gel catalysts are used in combination with blowing catalysts, the weight ratio of amine gel catalysts to blowing catalysts preferably being greater than 1, in particular greater than 2, particularly preferably greater than 3.

It is also possible to use organometallic gel catalysts in combination with blowing catalysts, the weight ratio of organometallic gel catalysts to blowing catalysts preferably being less than 1.

It is of course also possible to use any desired mixtures of amine and organometallic gel catalysts in combination with blowing catalysts, in which case the weight ratio of the gel catalysts to the blowing catalysts is preferably less than 2.

If, in addition to the gel catalysts and blowing catalysts, further catalysts customary in polyurethane chemistry are present, they are preferably used in amounts of not more than 0.5% by weight, based on the weight of the components (b) to (f).

Altogether, the total amount of catalyst combination is preferably less than 2, in particular less than 1, % by weight, based on the weight of the components (b) to (f).

If required, further assistants and/or additives (f) may also be incorporated into the reaction mixture for the preparation of the novel flexible polyurethane foams. Examples are flameproofing agents, stabilizers, fillers, dyes, pigments, UV stabilizers and hydrolysis stabilizers as well as fungistatic and bacteriostatic substances.

Examples of suitable flameproofing agents are tricresyl phosphate, tris(2-chloroethyl) phosphate, tris(2-chloropropyl) phosphate, tetrakis(2-chloroethyl) ethylene diphosphate, dimethyl methanephosphonate, diethyl diethanolaminomethylphosphonate and commercial halogen-containing polyol flameproofing agents. In addition to the abovementioned halogen-substituted phosphates, inorganic or organic flameproofing agents, such as red phosphorus, hydrated alumina, antimony trioxide, arsenic oxide, ammonium polyphosphate and calcium sulfate, expanded graphite or cyanuric acid derivatives, e.g. melamine, or mixtures of at least two flameproofing agents, e.g. ammonium polyphosphate and melamine, and, if required, corn starch or ammonium polyphosphate, melamine and expanded graphite and/or, if required, aromatic polyesters may also be used for flameproofing the polyisocyanate polyadducts. Additions of melamine have proven particularly effective. In general, it has proven expedient to use from 5 to 50, preferably from 5 to 25, parts by weight of said flameproofing agents per 100 parts by weight of the components (b) to (f).

The stabilizers used are in particular surface-active substances, i.e. compounds which serve for supporting the homogenization of the starting materials and may also be suitable for regulating the cell structure of the plastics. Examples are emulsifiers, such as the sodium salts of castor oil sulfates or fatty acids and salts of fatty acids with amines, for example of oleic acid with diethylamine, of stearic acid with diethanolamine and of ricinoleic acid with diethanolamine, salts of sulfonic acids, for example alkali metal or ammonium salts of dodecylbenzene- or dinaphthylmethanedisulfonic acid and ricinoleic acid; foam stabilizers, such as siloxane/oxyalkylene copolymers and other organopolysiloxanes, oxyethylated alkylphenols, oxyethylated fatty alcohols, liquid paraffins, castor oil esters or ricinoleic esters, turkey red oil and peanut oil, and cell regulators, such as paraffins, fatty alcohols and dimethylpolysiloxanes. Stabilizers used are predominantly organopolysiloxanes which are water-soluble. These comprise polydimethylsiloxane radicals onto which a polyether chain of ethylene oxide and propylene oxide has been grafted. The surface-active substances are usually used in amounts of from 0.01 to 5 parts by weight, based on 100 parts by weight of the components (b) to (f).

Fillers, in particular reinforcing fillers, are to be understood as meaning the conventional organic and inorganic fillers, reinforcing agents, weighting agents, compositions for improving the abrasion behavior in surface coatings, coating materials, etc., which are known per se. Specific examples are inorganic fillers, such as silicate minerals, for example sheet silicates, such as antigorite, serpentine, hornblendes, amphibole, chrysotile and talc, metal oxides, such as kaolin, aluminas, titanium oxides and iron oxides, metal salts, such as chalk, barite and inorganic pigments, such as calcium sulfide and zinc sulfide, as well as glass, etc. Kaolin (china clay), aluminum silicate and coprecipitates of barium sulfate and aluminum silicate and natural and synthetic fibrous minerals, such as wollastonite, metal fibers and in particular glass fibers of various lengths, which, if required, may be sized, are preferably used. Examples of suitable organic fillers are carbon, rosin, cyclopentadienyl resins and graft polymers and cellulosic fibers, polyimide, polyacrylonitrile, polyurethane and polyester fibers based on aromatic and/or aliphatic dicarboxylic esters, and in particular carbon fibers. The inorganic and organic fillers may be used individually or as mixtures and are incorporated into the reaction mixture advantageously in amounts of from 0.5 to 50, preferably from 1 to 40, % by weight, based on the weight of the components (a) to (f), but the content of mats, nonwovens and woven fabrics of natural and synthetic fibers may reach values up to 80.

Further information on the above mentioned other conventional assistants and additives are to be found in the technical literature, for example in the monograph by J. H. Saunders and K. C. Frisch, High Polymers, Volume XVI, Polyurethanes, Parts 1 and 2, Interscience Publishers 1962 and 1964, or the above-cited Kunststoffhandbuch, Polyurethane, Volume VII, Hanser-Verlag Munich, Vienna, 1st to 3rd Editions.

For the preparation of suitable foams, the organic and/or modified organic polyisocyanates (a), the polyetherol mixture (b) and, if required, further compounds (c) having hydrogen atoms reactive toward isocyanates and further components (d) to (f) are reacted in amounts such that the ratio of the number of equivalents of NCO groups of the polyisocyanates (a) to the sum of the reactive hydrogen atoms of the components (b) to (f) is from 0.20:1 to 1.2:1, preferably from 0.4:1 to 1.1:1.

Polyurethane foams obtained by such processes are advantageously prepared by continuously applying the reaction mixture to suitable belt lines for producing slabstock foam.

The resulting foams can be used in step (i) of the present invention or may be treated before being subjected to the process of the present invention. Suitable treatment steps may include annealing or curing steps.

Suitable polyurethane foams prepared by the said process preferably have a density of from 10 to 800, preferably from 15 to 150, in particular from 20 to 60, g/l. Suitable foams preferably have a water absorptivity of more than 130%, more preferable of more than 140%, in particular of more than 150%. Therefore, according to a further embodiment the present invention also relates to a process as disclosed above, wherein the foam (F1) is a polyurethane foam with a water absorptivity of more than 130%.

In case foam (F1) is a polyurethane foam, the thermoforming preferably is carried out at a temperature in the range of from 150 to 240° C., more preferable in the range of from 180 to 220° C. Therefore, according to a further embodiment the present invention also relates to a process as disclosed above, wherein the thermoforming is carried out at a temperature in the range of from 150 to 240° C.

The foams obtained according to the present invention have a Poisson's ratio in the range of from −0.8 to 0.3, for example in the range of from −0.5 to 0.3, in the range of from −0.5 to 0.2, preferably in the range of from −0.5 to 0.1, in particular in the range of from −0.4 to 0.1, in the range of from −0.3 to 0.1, in the range of from −0.3 to 0, more preferable in the range of from −0.4 to 0. According to a further aspect, the present invention also relates to a foam obtained or obtainable according to a process as disclosed above. The foams show auxetic behavior.

According to a further embodiment the present invention also relates to a foam as disclosed above, wherein the Poisson's ratio of the foam is in the range of from −0.4 to 0.

The foams according to the present invention or the foams obtained or obtainable by a process according to the present invention are suitable for many applications, in particular in applications which require energy absorbing properties. The foams may for example be used as energy absorbing device, preferably in protective gear, in furniture, in cushions, for example cushions for vehicles such as cars or airplanes, cleaning devices with improved cleaning or rinse-out behavior, such as brushes, in shoe soles, or as sealing, insulating or anchorage providing material for example used in earphones, ear plugs or dowels, or as acoustic material.

According to a further aspect, the present invention also relates to the use of a foam according to the present invention or a foam obtained or obtainable according to the process according to the present invention as energy absorbing device, preferably in protective gear, furniture, cushions, cleaning devices in shoe soles, or as acoustic material.

The present invention includes the following embodiments, wherein these include the specific combinations of embodiments as indicated by the respective interdependencies defined therein.

1. Process for preparing a foam (FA) with a Poisson's ratio in the range of from −0.8 to 0.3 comprising the steps (i) and (ii):
   (i) providing a foam (F1) with a flow resistance in the range of from 3000 to 8000 Pas/m², determined according to DIN EN 29053,
   (ii) subjecting the foam (F1) to thermoforming comprising triaxial compression,
   wherein the foam (F1) is not reticulated prior to step (ii).
2. The process according to embodiment 1, wherein the thermoforming is carried out with a linear compression ratio (LCR) in all three directions in the range of from 0.33 to 0.9.
3. Process for preparing a foam (FA) with a Poisson's ratio in the range of from −0.8 to 0.3 comprising the steps (i) and (ii):
   (i) providing a foam (F1) with a flow resistance in the range of from 3000 to 8000 Pas/m², determined according to DIN EN 29053,
   (ii) subjecting the foam (F1) to thermoforming comprising triaxial compression,
   wherein the foam (F1) is not reticulated prior to step (ii),
   wherein the thermoforming is carried out with a linear compression ratio (LCR) in all three directions in the range of from 0.33 to 0.9.
4. The process according to any of embodiments 1 to 3, wherein the foam (F1) is a foam based on melamine and formaldehyde with a density in the range of from 3 to 20 g/l.
5. Process for preparing a foam (FA) with a Poisson's ratio in the range of from −0.8 to 0.3 comprising the steps (i) and (ii):
   (i) providing a foam (F1) with a flow resistance in the range of from 3000 to 8000 Pas/m², determined according to DIN EN 29053,
   (ii) subjecting the foam (F1) to thermoforming comprising triaxial compression,
   wherein the foam (F1) is not reticulated prior to step (ii).
   wherein the foam (F1) is a foam based on melamine and formaldehyde with a density in the range of from 3 to 20 g/l.
6. The process according to any of embodiments 1 to 5, wherein step (ii) comprises at least one compression step (C1) at a temperature (T1) and at least one demolding step (D).
7. The process according to any of embodiments 1 to 6, wherein the foam (F1) is a foam based on melamine and formaldehyde with a density in the range of from 5 to 13 g/l.
8. The process according to any of embodiments 1 to 7, wherein the foam (F1) is a foam based on melamine and formaldehyde in a ratio in the range of from 1:1 to 1:3.
9. The process according to any of embodiments 1 to 8, wherein the thermoforming is carried out at a temperature in the range of from 120 to 260° C.
10. The process according to any of embodiments 1 to 3, wherein the foam (F1) is a polyurethane foam with a density in the range of from 10 to 150 g/l.
11. Process for preparing a foam (FA) with a Poisson's ratio in the range of from −0.8 to 0.3 comprising the steps (i) and (ii):
    (i) providing a foam (F1) with a flow resistance in the range of from 3000 to 8000 Pas/m², determined according to DIN EN 29053,
    (ii) subjecting the foam (F1) to thermoforming comprising triaxial compression,
    wherein the foam (F1) is not reticulated prior to step (ii),
    wherein the foam (F1) is a polyurethane foam with a density in the range of from 10 to 150 g/l.
12. The process according to any of embodiments 1 to 11, wherein step (ii) comprises at least one compression step (C1) at a temperature (T1) and at least one demolding step (D).
13. The process according to any of embodiments 1 to 3, wherein the foam (F1) is a polyurethane foam with a water absorptivity of more than 130%.
14. The process according to any of embodiments 10 to 12, wherein the foam (F1) is a polyurethane foam with a water absorptivity of more than 130%.
16. The process according to any of embodiments 1 to 3, wherein the thermoforming is carried out in a temperature range of from 150 to 240° C.
17. The process according to any of embodiments 10 to 16, wherein the thermoforming is carried out in a temperature range of from 150 to 240° C.
18. A foam obtained or obtainable according to a process according to any of embodiments 1 to 17.
19. The foam according to embodiment 18, wherein the Poisson's ratio of the foam is in the range of from −0.4 to 0.
20. Use of a foam according to embodiment 18 or 19 or a foam obtained or obtainable according to the process according to any of embodiments 1 to 17 as energy absorbing device, preferably in protective gear, furniture, cushions, cleaning devices with improved cleaning or rinse-out behavior, in shoe soles, or as sealing, insulating or anchorage providing material for example used in earphones, ear plugs or dowels, or as acoustic material.

Examples will be used below to illustrate the invention.

EXAMPLES

1 Foam Conversion Process

The thermoforming process is described for a block of foam with the a length L, a width W and a depth D.

A linear compression ratio (compressed-to-uncompressed dimension) LCR was defined, based on prior experience of auxetic foam conversion, and was employed in all three directions during conversion by inserting the foam into a metallic conversion mold of internal dimensions LCR×L and LCR×W and LCR×D. Lubricant (cooking oil) and/or spatulas were used as required to minimize surface creasing during insertion of the foam into the conversion mold. End tabs were applied to the end of the mold once the foam was inserted.

The mold and foam were placed in an oven at the conversion temperature for 15 minutes. The foam was then removed quickly and relaxed to avoid adhesion of ribs and to minimize surface creasing, and then reinserted into the mold at the conversion temperature for a further 10 minutes, followed by 20 min at half of conversion temperature. Finally, the foam was allowed to cool in the mold to ambient temperature prior to removal from the mold.

In the thermoforming step, a block with length LCR(L), a width LCR(W) and a depth LCR(D) is obtained.

2 Conversion Conditions and Results

| Foam | Density (g/l) | Conversion Temp (° C.) | LCR | Poisson's ratio |
|---|---|---|---|---|
| Comparative example: reticulated PU foam* | | | | −0.29 |
| Supersoft PU foam | 37 | 200 | 0.7 | −0.39 |
| Superaoft PU foam | 37 | n.a. | 1 | 0.36 |
| Comparative example: Basotec** | | | | −0.07 |
| Basotect TG | 9 | 180 | 0.6 | −0.13 |
| Basotect TG | 9 | n.a. | 1 | 0.36 |

*C.W. Smith et al. J Mater Sci (2008) 43: 5851-5860
**C. Ge Journal of Cellular Plastics 2013 49(6) 521-533 (herein denoted as Basotec)

LITERATURE CITED

WO 88/00523 A1
EP 011752 A1
U.S. Pat. No. 4,374,209
DE 3231497 A1
EP 17671 A1
EP 37470 A1
DE 1111394 A1
DE 1222669 A1
DE 1152536 A1
DE 1152537 A1
U.S. Pat. No. 3,267,050
DE 1215373 A1
EP 0351614 A1
Houben-Weyl, Methoden der organischen Chemie, Volume 14/2, 1963, pages 319 to 402
C. W. Smith et al. J Mater Sci (2008) 43:5851-5860
C. Ge Journal of Cellular Plastics 2013 49(6) 521-533

The invention claimed is:

1. A process for preparing a foam (FA) with a Poisson's ratio in the range of from −0.8 to 0.3, the method comprising the steps (i) and (ii):
   (i) providing a foam (F1) with a flow resistance in the range of from 3000 to 8000 Pas/m2, determined according to DIN EN 29053, and
   (ii) subjecting the foam (F1) to thermoforming comprising triaxial compression,
   wherein the foam (F1) is not reticulated prior to step (ii).

2. The process according to claim 1, wherein the thermoforming is carried out with a linear compression ratio (LCR) in all three directions in the range of from 0.33 to 0.9.

3. The process according to claim 1, wherein step (ii) comprises at least one compression step (C1) at a temperature (T1) and at least one demolding step (D).

4. The process according to claim 1, wherein the foam (F1) is a foam based on melamine and formaldehyde with a density in the range of from 3 to 20 g/l.

5. The process according to claim 1, wherein the foam (F1) is a foam based on melamine and formaldehyde in a ratio in the range of from 1:1 to 1:3.

6. The process according to claim 1, wherein the thermoforming is carried out at a temperature in the range of from 120 to 260° C.

7. The process according to claim 1, wherein the foam (F1) is a polyurethane foam with a density in the range of from 10 to 150 g/l.

8. The process according to claim 1, wherein the foam (F1) is a polyurethane foam with a water absorptivity of more than 130%.

9. The process according to claim 6, wherein the thermoforming is carried out at a temperature range of from 120 to 240° C.

10. A foam obtained or obtainable according to a process according to claim 1.

11. The foam according to claim 10, wherein the Poisson's ratio of the foam is in the range of from −0.4 to 0.

12. A method of using a foam according to claim 10, the method comprising using the foam as energy absorbing device, as sealing, insulating or anchorage providing material, or as acoustic material.

* * * * *